United States Patent [19]
Feit

[11] 3,715,327
[45] Feb. 6, 1973

[54] WATER RESISTANT AND WATER REPELLENT PAINT COMPOSITIONS CONTAINING A LATEX OF A VINYL ESTER POLYMER

[76] Inventor: Leo Feit, 49 Daventry Court, Johannesburg, Republic of South Africa

[22] Filed: May 20, 1971

[21] Appl. No.: 145,523

[52] U.S. Cl. ............... 260/17 R, 106/170, 106/171, 106/197, 260/23 AR, 260/23 EP, 260/31.8 R, 260/45.85
[51] Int. Cl. ............................................. C09d 3/74
[58] Field of Search ............. 260/17 R, 23 EP, 23 AR

[56] References Cited

UNITED STATES PATENTS

| | | | |
|---|---|---|---|
| 2,388,613 | 11/1945 | Keller | 106/170 |
| 3,280,050 | 10/1966 | Johnson | 260/17 R |
| 3,324,056 | 6/1967 | Vona et al. | 260/17 R |

OTHER PUBLICATIONS

Singer, Fundamentals of Paint, Varnish & Lacquer Tech. (The Amer. Paint Journ. Co., St. Louis, Mo.) 1962, pp. 240–241.

*Primary Examiner*—William H. Short
*Assistant Examiner*—L. M. Phynes
*Attorney*—Watson, Cole, Grindle & Watson

[57] ABSTRACT

A water resisting and water repelling paint comprising an aqueous emulsion containing a synthetic latex of a vinyl ester homopolymer or copolymer and as an additive thereto, a product resulting from the thermal interaction of:

a. 0.5 to 15 parts by weight of ethyl cellulose,
b. 0.5 to 20 parts by weight of fatty acid containing 10 to 24 carbon atoms, for example, stearine,
c. 0.25 to 15 parts by weight of mono-, di- or trialkylamine or alkanolamine, for example, triethanolamine, or morpholine,
d. 0.5 to 150 parts by weight of an oil selected from the group of a drying and semi-drying vegetable oil, and mixtures, thereof,
e. 0.5 to 50 parts by weight of a compound selected from the group of phthalic acid ester, benzoic acid ester, phosphoric acid ester, chlorinated diphenyl, substituted diphenyl and mixtures thereof, and/or
f. 0.5 to 50 parts by weight of a compound selected from the group of epoxidized triglyceride ester, epoxidized aliphatic alcohol ester of unsaturated fatty acids having a molecular weight of 300 to 5,000 and mixtures thereof,
g. 0.5 to 50 parts by weight of a compound selected from the group of calcium stearate, magnesium stearate, aluminum stearate and mixtures thereof, and/or
h. 0.5 to 50 parts by weight of mineral oil, specific gravity of 0.85 to 0.95 and boiling point of 185° to 285° C.

1 Claim, No Drawings

WATER RESISTANT AND WATER REPELLENT PAINT COMPOSITIONS CONTAINING A LATEX OF A VINYL ESTER POLYMER

THIS invention relates to a paint which is based on an aqueous emulsion, the continuous phase of which is water and containing a synthetic latex of a vinyl ester homopolymer or copolymer in aqueous emulsion, and which is rendered highly water resistant and water repellent on drying through the use of a particular additive.

The aforesaid paint is used industrially and domestically for decorating or protecting surfaces of substrates and is applied by coating, brushing on or by other suitable means.

Latices of vinyl ester polymers are produced by polymerizing monomers as a dispersion in water which is stabilized by an emulsion system of colloids. The colloids employed are water soluble and retain their solubility substantially permanently. Due to such water solubility and the tendency of the polymer to swell when coming into contact on drying with water, dry coatings formed from such paints will swell and re-emulsify on coming into contact with water. The swelling loosens the cohesion of the polymer in the latex and the re-emulsification affects the washability and the durability of the coatings. The use of such paints is therefore limited to applications in which a high degree of water resistance is inessential or in which the coated surfaces are not subject to weathering influences.

The present invention provides a paint which is rendered water resistant and water repellent on drying and thus may be used where a high degree of water resistance is essential or where the coated surfaces are subject to weathering influences.

According to the present invention the paint is rendered water resistant and water repellent by adding thereto a product obtained by the thermal interaction of the following components:

a. 0.5 to 15 parts by weight of ethyl cellulose,
b. 0.5 to 20 parts by weight of fatty acid containing 10 to 24 carbon atoms, for example, stearine,
c. 0.25 to 15 parts by weight of mono-, di- or trialkylamine or alkanolamine, for example, triethanolamine, or morpholine,
d. 0.5 to 150 parts by weight of drying or semi-drying vegetable oils or mixtures thereof,
e. 0.5 to 50 parts by weight of phthalic acid ester, benzoic acid ester, phosphoric acid ester, chlorinated diphenyl, substituted diphenyl or mixtures thereof, and/or
f. 0.5 to 50 parts by weight of epoxidized triglyceride ester or epoxidized aliphatic alcohol ester of unsaturated fatty acids having a molecular weight of 300 to 5,000 or mixtures thereof,
g. 0.5 to 50 parts by weight of a compound selected from the group of calcium stearate, magnesium stearate, aluminum stearate and mixtures thereof, and/or
h. 0.5 to 50 parts by weight of mineral oil, specific gravity of 0.85 to 0.95 and boiling point of 185° to 285° C.

The present invention is applicable to conventionally composed water-based synthetic latex paints containing vinyl ester homopolymer or copolymer latices. The product resulting from the thermal interaction the components (a) to (h) can be added to conventional synthetic latex paints during the course of manufacture and such paints can contain the usual additives employed in the production of the paints including fillers, pigments, dyes, thickeners, surface active agents, wetting agents, flatting agents, anti-static agents, ultra violet ray screen-out agents, stabilizing agents against electrolytes, anti-freeze agents, film coalescing agents, buffer agents, preservatives, emulsification aids including ammonium hydroxide, levelling aids, gloss improving agents and anti-foam agents including mineral oil (essentially a mixture of hydrocarbons being a refined fraction of mineral oil having a specific gravity of 0.85 to 0.95 and a boiling point of 185° to 285° C.).

The vinyl ester polymer latices contained in paint made according to the present process can be a homopolymer of a vinyl ester of a fatty acid containing two to 18 carbon atoms, for example vinyl acetate, or a copolymer of such a vinyl ester of a fatty acid with other ethylenically unsaturated monomers which are co-polymerizable therewith including, for example, other esters of fatty acids in aqueous emulsion. In the case of copolymers the amount of the comonomer (other than the vinyl ester) in the prepolymerization mixture can range within 5 and 45 percent by weight of the total monomers. The amount of polymer in the latex is preferably 50 to 60 percent by weight of the latex.

In another embodiment of the present invention the fatty acid containing 10 to 24 carbon atoms and mono-, di- or trialkylamine or alkanolamine or morpholine components are not used individually, but are pre-reacted separately and used as a pre-reacted product in preparing the product resulting from the thermal interaction of the components (a) to (h).

The product obtained from the thermal interaction of the components (a) to (h) which renders coatings of paint such as mentioned above water resistant and water repellent on drying is prepared by converting the following components at a temperature of 150° to 230° C. The parts stated below are parts by weight: 0.5 to 15 parts of ethyl cellulose, 0.5 to 20 parts of fatty acid containing 10 to 24 carbon atoms, 0.25 to 15 parts of mono-, di- or trialkylamine or alkanolamine or morpholine, 0.5 to 50 parts of phthalic acid ester, benzoic acid ester, phosphoric acid ester, chlorinated diphenyl, substituted diphenyl or mixtures thereof, and/or 0.5 to 50 parts of epoxidized triglyceride ester or of epoxidized aliphatic alcohol ester of unsaturated fatty acids having a molecular weight of 300 to 5,000 or mixtures thereof, 0.5 to 150 parts of drying or semi-drying vegetable oils or mixtures thereof, 0.5 to 50 parts of calcium stearate, magnesium stearate, aluminum stearate or mixtures thereof and/or 0.5 to 50 parts of mineral oil specific gravity 0.85 to 0.95, boiling point 185° to 285° C.

The product is cooled to room temperature and though being highly viscous disperses well in components such as are usually employed in the production of synthetic latex paint.

A preferred product resulting from the thermal interaction of the components (a) to (h) is prepared in the following manner: 10 parts of ethyl cellulose preferably of an ethoxyl content of 45 to 50 percent and 4 parts of stearine preferably of a stearic acid/palmitic acid content of 90 percent are heated together with 15 parts of a benzoic acid ester preferably dipropylene glycol dibenzoate to a temperature of 150° to 230° C to liquefy the solids, the temperature depending on the flow point of the ethyl cellulose. Then, 2 parts of triethanolamine are admixed under vigorous stirring which is continued for 20 minutes. Thereupon, 100 parts of raw linseed oil are admixed under stirring which is continued for 10 minutes. Thereupon 14 parts of calcium stearate are admixed with stirring which is continued for 20 minutes. Then, 16 parts of mineral oil specific gravity 0.88 is admixed with stirring. The temperature of the mass is maintained throughout the processing at 150° to 230° C. The mass is then allowed to cool gradually to room temperature. All parts are parts by weight.

The cooled mass though highly viscous disperses well in components such as used in the products of synthetic latex paints.

Should the components stearine and triethanolamine not be used as individual products in preparing the product resulting from the components (a) to (h), but as a pre-reacted product, then 6 parts by weight of the product resulting from the pre-reaction are added to the mixture of ethyl cellulose and dipropylene glycol dibenzoate. The stearine and triethanolamine are pre-reacted by admixing the triethanolamine heated to 50° C to the stearine heated to 90° C under vigorous stirring which is continued for 20 minutes.

In preparing the product resulting from the thermal interaction of the components (a) to (h), the ratio of the components to each other within the lower and upper limits stated above is governed, by the type and amount of ingredients used in the production of the paint into which the resulting product is to be incorporated. For example, if the paint contains large amounts of fillers and pigments and of hydrophilic colloids and thickeners, a higher ratio of the components to each other will be required for the interacted product to render dried coatings of the paint water resistant and water repellent. A suitable ratio should in individual cases be established by practical trials. The amount of the invented additive product resulting from the components (a) to (h) to be added to individual paint should also be established by practical trials. Paint containing not more than 40 percent by weight of the paint of fillers and pigments and not more than 5 percent — calculated as solids of hydrophilic colloids and thickeners—give coatings which on drying are highly water resistant and water repellent when 25 parts by weight are added to the paint of the invented additive product prepared according to the preferred formulation stated above.

The invention is further illustrated by the following examples. In these examples all parts are parts by weight:

EXAMPLE 1

An additive product resulting from the thermal interaction of the components (a) to (h) was produced as follows:

At a temperature of 150° to 230° C 10 parts of ethyl cellulose and 6 parts of triethanolamine stearate in 15 parts of dipropylene glycol dibenzoate were liquefied with stirring. The temperature was maintained and the stirring continued for 20 minutes. Thereupon, were admixed under stirring 100 parts of raw linseed oil and the stirring continued for 10 minutes. Then 10 parts of calcium stearate were admixed with stirring followed by 16 parts of mineral oil and the stirring continued for 20 minutes. The product obtained was allowed to cool gradually to room temperature and to mature for 4 days.

The matured product was used in the production of a paint which applied to a substrate and dried was highly water resistant and water repellent.

The paint was prepared as follows:

To 110 parts of cold water in which was dissolved cold 1 part of sodium pyrophosphate were admixed incrementally under stirring 200 parts of calcium carbonate and 250 parts of titanium dioxide (rutile). The stirring was continued for 30 minutes to form a paste. To the paste were then admixed incrementally under stirring in the order as stated: 25 parts of the additive product of the invention prepared as aforementioned, 200 parts of a solution of 2 percent of hydroxyethyl cellulose in water (vicosity 4,000 cp.), 50 parts of cold water, 410 parts of vinyl ester copolymer containing in the pre-polymerization mixture 40 parts of vinyl acetate and 20 parts of ethyl acrylate in aqueous emulsion, 0.3 parts of a preservative (10 percent solution of phenyl mercury in white spirit), 65 parts of cold water, 3 parts of ammonium hydroxide 25% $NH_3$ and 5 parts of mineral oil. The mass was stirred for 30 minutes and then allowed to mature for 6 days.

The resulting paint was tested in the following manner:

A tray made from polystyrene having an inner depth of 2 cm. was weighed and the weight noted. The floor of the tray was coated twice with the paint at an interval of 3 hours for drying. Each of the coatings had in the wet state a thickness of 0.127mm. The coatings were air dried at room temperature and 50 percent relative humidity for 14 days. The tray was then filled with water of room temperature and the coating thus submerged. The coating remained submerged for 4 days in the water, any evaporated water being replenished from time to time.

The water was then drained off and the wet coating rubbed hard by finger for 1 minute. No pigment rubbed off and there was no trace of swelling of the coating during the submersion in water or of re-emulsification. The tray was then dried with blotting paper, weighed and the weight compared with that ascertained before the coating was submerged in the water. There was only a slight difference in the weight which was apparently due more to residual moisture of the tray than to water absorption by the coating. The water repellence of the coating was not diminished by the submersion in water.

Comparative test:

A paint prepared by the same procedure but without the invented additive product, all other ingredients being identical, was tested in the same manner as stated above with the following result: The coating had swollen during the submersion in water, pigment rubbed off when the coating was rubbed in the wet state by finger and the difference in weight compared to the weight ascertained before submerging the coating in water was appreciable.

EXAMPLE 2

The components in this example were the same as in example 1 except that the vinyl ester polymer in the latex was a vinyl acetate homopolymer. The test result did not differ materially from that of Example 1.

EXAMPLE 3

The same components and the same manner of preparing the paint as in example 1 was used except that in the invented additive product no dipropylene glycol dibenzoate was used but instead a like amount of dibutyl phthalate, butyl benzyl phthalate and tricresyl phosphate or a mixture of these esters with epoxidized triglyceride ester of a molecular weight of 800 or epoxidized aliphatic alcohol ester of unsaturated fatty acids of a molecular weight of 364 in a ratio of 80:20 was used.

The dried coating of the paint was somewhat tougher than that of example 1, but otherwise the test result did not differ materially from that of Example 1.

EXAMPLE 4

In this example the same components and the same manner of preparing the paint as in Example 1 was used except that no mineral oil was employed. The dried coating of the paint was of a lesser gloss than that of example 1, but otherwise the test result did not differ materially from that of Example 1.

EXAMPLE 5

The components in this example were the same as in example 1 except that in the product obtained from interaction of the components (a) to (h) the raw linseed oil was not used alone, but in mixture with hempseed oil, tall oil, soyabean oil, sunflower oil, tung oil, oiticica oil, and/or dehydrated castor oil, in a ratio of 80:20. The dried coating of the paint had a higher gloss than that of example 1, but otherwise the test result did not differ materially form that of Example 1.

I claim:

1. A latex paint comprising an aqueous emulsion containing a latex of a polymer selected from the group consisting of homopolymers of vinyl esters of fatty acids containing 2 to 18 carbon atoms and copolymers of such vinyl esters with other ethylenically unsaturated monomers which are copolymerizable therewith, and an additive comprising a product resulting from the thermal interaction of:

a. 0.5 to 15 parts by weight of ethyl cellulose,
   b. 0.5 to 20 parts by weight of a fatty acid having 10 to 24 carbon atoms,
   c. 0.25 to 15 parts by weight of an amine selected from the group consisting of triethanolamine and morpholine,
   d. 0.5 to 150 parts by weight of an oil selected from the group consisting of drying and semi-drying vegetable oils and mixtures thereof,
   e. 0.5 to 50 parts by weight of one or more of dipropylene glycol dibenzoate, dibutyl phthalate, butyl benzyl phthalate, tricresyl phosphate, chlorinated diphenyl, and expoxidized triglyceride esters and expoxidized aliphatic alcohol esters of unsaturated fatty acids having molecular weights within the range of about 300 to about 5,000, and
   f. 0.5 to 50 parts by weight of one or more of calcium stearate, magnesium stearate, aluminum stearate and a mineral oil having a specific gravity of about 0.85 to 0.95 and a boiling point of about 185° to 285°C.

* * * * *